(12) United States Patent
Franke et al.

(10) Patent No.: US 10,556,364 B2
(45) Date of Patent: Feb. 11, 2020

(54) METHOD FOR PRODUCING A MOLDED INSULATING PART, MOLDED INSULATING PART PRODUCED BY SAID METHOD

(71) Applicant: CUYLITS HOLDING GMBH, Bersenbrueck (DE)

(72) Inventors: Joerg Franke, Fuerstenau (DE); Diederik Cuylits, Bersenbrueck (DE)

(73) Assignee: CUYLITS HOLDING GMBH, Bersenbrueck (DE)

( * ) Notice: Subject to any disclaimer, the term of this patent is extended or adjusted under 35 U.S.C. 154(b) by 0 days.

(21) Appl. No.: 15/523,558

(22) PCT Filed: Oct. 27, 2015

(86) PCT No.: PCT/DE2015/100451
§ 371 (c)(1),
(2) Date: May 1, 2017

(87) PCT Pub. No.: WO2016/070866
PCT Pub. Date: May 12, 2016

(65) Prior Publication Data
US 2017/0320233 A1   Nov. 9, 2017

(30) Foreign Application Priority Data

Nov. 3, 2014   (DE) .................... 10 2014 115 940

(51) Int. Cl.
| | |
|---|---|
| B28B 1/52 | (2006.01) |
| B28B 1/26 | (2006.01) |
| C04B 33/04 | (2006.01) |

(52) U.S. Cl.
CPC ............... *B28B 1/52* (2013.01); *B28B 1/265* (2013.01); *C04B 33/04* (2013.01);
(Continued)

(58) Field of Classification Search
CPC ........ D21J 3/00; D21J 3/10; D21J 3/12; D21J 5/00; D21J 7/00; D21H 17/675;
(Continued)

(56) References Cited

U.S. PATENT DOCUMENTS

| | | | | |
|---|---|---|---|---|
| 4,321,161 A | * | 3/1982 | Watanabe | ............... A47K 10/16 |
| | | | | 106/797 |
| 4,935,387 A | * | 6/1990 | Beall | ..................... C03C 14/002 |
| | | | | 428/698 |

(Continued)

FOREIGN PATENT DOCUMENTS

| | | |
|---|---|---|
| CA | 1041559 A | 10/1978 |
| DE | 292230 A5 | 7/1991 |

(Continued)

OTHER PUBLICATIONS

Wallenberger et al., in "Glass Fibers," ASM Handbook, vol. 21 pp. 27-34 (Year: 2001).*
ISR of PCT/DE2015/100451 mailed Jun. 4, 2016.

*Primary Examiner* — Jose A Fortuna
(74) *Attorney, Agent, or Firm* — Cohen & Hildebrand, PLLC

(57) ABSTRACT

A process for producing a molded insulating part, a molded insulating part and a casting tool for the production of an inorganic pulp composed of water, glass fibers and/or mineral fibers and sheet silicate, introduction of the pulp into a cavity of a casting tool whose wall is at least partially water-permeable, which cavity has on at least one side the negative shape of the molded insulating part to be produced, removal of the aqueous fraction present in the pulp, opening of the casting tool and subsequent taking-out of the molded insulating part produced. The pulp produced using water for producing the molded insulating part comprised a glass fiber/sheet silicate mixture or mineral fiber/sheet silicate mixture has a proportion of exclusively synthetic sheet silicate (5) in the range from 0.5% to 2.5% and a proportion of glass fibers and/or mineral fibers (4) of from 0.3 to 1.5%.

16 Claims, 3 Drawing Sheets

(52) U.S. Cl.
CPC .. *C04B 2235/349* (2013.01); *C04B 2235/522* (2013.01); *C04B 2235/6028* (2013.01)

(58) Field of Classification Search
CPC .............. D21H 17/68; C04B 2235/349; C04B 2235/36; C04B 2235/522; C04B 2235/6028; C04B 2235/65; C04B 33/04; B28B 1/265; B28B 1/52; Y10S 428/902; Y10T 428/1372; Y10T 428/139; Y10T 428/1397
See application file for complete search history.

(56) References Cited

U.S. PATENT DOCUMENTS

| | | | |
|---|---|---|---|
| 4,948,758 A * | 8/1990 | Beall | C03C 14/002 428/698 |
| 5,013,500 A | 5/1991 | Hamanaka et al. | |
| 2004/0011489 A1 * | 1/2004 | Kimbara | D21J 3/10 162/218 |
| 2010/0159175 A1 * | 6/2010 | Stoeppelmann | C08K 9/08 428/36.9 |
| 2013/0146118 A1 * | 6/2013 | Kelley | H05K 5/02 136/244 |
| 2017/0320233 A1 * | 11/2017 | Franke | B28B 1/265 |

FOREIGN PATENT DOCUMENTS

| | | | | |
|---|---|---|---|---|
| DE | 3888279 T2 | | 9/1994 | |
| DE | 19819299 A1 | * | 11/1999 | ............ C08G 69/04 |
| DE | 102014115940 A1 | * | 5/2016 | ............ B28B 1/265 |
| DE | 102016122476 A1 | * | 5/2018 | |
| EP | 0696556 A1 | * | 2/1996 | .......... C03C 14/002 |
| EP | 1081285 A1 | | 3/2001 | |
| EP | 1927447 A2 | | 6/2008 | |
| GB | 1383305 A | | 2/1974 | |
| JP | 2009035592 A | * | 2/2009 | |
| WO | 2011018457 A1 | | 2/2011 | |

* cited by examiner

METHOD FOR PRODUCING A MOLDED INSULATING PART, MOLDED INSULATING PART PRODUCED BY SAID METHOD

This is an application filed under 35 USC § 371 of PCT/DE 2015/100451, filed on Oct. 27, 2015 claiming priority to DE 10 2014 115 9403, filed on Nov. 3, 2014, which applications are herein incorporated by reference in their entirety.

BACKGROUND OF THE INVENTION

The invention relates to a process for producing a molded insulating part, a molded insulating part produced by this process and a casting tool for producing a molded insulating part using the process.

Molded insulating parts which are joined with an accurate fit to a counterpiece to be insulated are known in various embodiments and are already in use. Thus, for example, the use of such molded insulating parts for insulating individual elements in the engine compartment or the exhaust gas train in motor vehicles is gaining increasing importance. The catalysts used in a motor vehicle, in particular, have to be brought to their operating temperature in a very short time and operated at this, which requires correspondingly complicated insulation. For this use, it is necessary to have, for example, a molded insulating part which can withstand temperatures of from 600° C. to above 1000° C. and can be optimally fitted between the surface of the catalyst and the outer wall thereof. The outer wall of the catalyst serving for thermal and acoustic shielding is generally made of a perforated metal sheet which has a complex shape and into which cut-to-size glass fiber mats are laid. Considerable amounts of scrap are naturally obtained here, and these are to be disposed of in a complicated manner. The glass fiber mat scraps are generally reused. In addition, the production of such insulation is associated with a considerable outlay in terms of work, which ultimately also increases the production costs. A further disadvantage is that the glass fiber mats cannot be optimally matched to the complex geometries of the wall of the catalyst and, for example, undesirable folding is required as a result, which can ultimately lead to premature wear of the molded insulating part and locally restricted insulation of the catalyst.

Apart from the use of the abovementioned glass fiber mats for producing insulation, producing molded insulating parts from an aqueous solution with fiber components introduced therein is also known. The mixture of fiber components and water with use of various additives is also referred to as "pulp". Such production processes for a molded insulating part are known, for example, from DD 292 230 A5, with the pulp here in each case having proportions of organic compounds. A disadvantage of the organic constituents in the pulp is that these constituents lead on heating to damaging or at least troublesome or undesirable emissions, which is, in particular, of considerable importance in the abovementioned use of such molded insulating parts for insulating individual elements in the engine compartment or the exhaust gas train in motor vehicles.

WO 2011/018457 A1 additionally discloses a process for producing a dimensionally stable but not brittle molded insulating part from a fibrous insulating material, in which a textile sheet containing glass fibers and/or silicate fibers is treated with at least one silazane in solution or as solid, which can, for example, be effected by impregnation. The textile sheet can be a nonwoven, a knitted fabric or a woven fabric. For the present purposes, a silazane is a monomeric, oligomeric or polymeric silazane. To cure the silazane, it is additionally necessary to use a catalyst, with the document disclosing, for example, N-heterocyclic compounds, monoalkylamines, dialkylamines, trialkylamines, organic acids and similar organic substances or compounds. Some of these organic additives likewise have the abovementioned disadvantages. In addition, for example, the handling of organic solvents is difficult because of the health risks associated therewith and their combustibility. Additional production costs also arise because an after-combustion is usually necessary to remove the organic constituents.

DE 38 88 279 T2 relates to a process for producing a ceramic lining, wherein a ceramic slurry is introduced into a water-absorbing or water-withdrawing mold, where the mold has at least one water-impermeable seal in a region which after manufacture of the lining forms a valve hole. Absorption or uptake of water from the ceramic slurry results in deposition of the ceramic raw material present in the ceramic slurry. However, the peripheral edges of the lining produced in this way have to be corrected subsequently.

Furthermore, EP 1 081 285 A1 discloses a process for an article produced from a pulp, in which a pulp slurry which has a specific composition and is defined in more detail in the document is introduced into the hollow space of a mold and a preferably liquid flow medium is additionally used in order to press the pulp deposition body onto the interior wall of the hollow space of the mold. The process can be employed again using a pulp having a different composition, so that a multilayer body is formed thereby.

Finally, EP 1 927 447 A2 discloses monolithic, ceramic molded castings and pressure castings for chimney construction and corresponding processes for the production thereof. Here, a siliceous suspension is introduced by casting or by means of pressure casting into a casting mold having a porous surface, so that a green body is formed and after production is separated from the casting mold, dried and subsequently fired in a furnace.

BRIEF SUMMARY OF THE INVENTION

It is an object of the invention to provide a process for producing a molded insulating part and a molded insulating part which is produced thereby and can be produced with very high dimensional accuracy using few, simple process steps. A further objective of the invention is to provide a suitable casting tool for use of the process.

The process of the invention for producing a molded insulating part is characterized by the following process steps:
  production of an inorganic pulp composed of water, glass fibers and/or mineral fibers and sheet silicate,
  introduction of the pulp into a cavity of a casting tool whose wall is at least partially water-permeable, which cavity has on at least one side the negative shape of the molded insulating part to be produced,
  removal of the aqueous fraction present in the pulp,
  opening of the casting tool and subsequent taking-out of the molded insulating part produced.

The term sheet silicates is used to refer generally to silicates including, for example, rock-forming minerals such as the mica group, chlorite group, kaolin and serpentine group. The industrially important clay minerals which are widespread in sedimentary rocks are likewise sheet silicates. For the purposes of the invention, however, preference is given to water-soluble, synthetic sheet silicates since these are of higher quality and have reproducible properties. The sheet-like or house-of-cards-like structure of the sheet silicates determines their form and properties. Good translation capability along the layers additionally results in great deformability of the sheet silicates. Water molecules and cations, for example, can be intercalated between the layers. Sheet silicates are also swellable and have a cation exchange capacity.

Furthermore, synthetic sheet silicates can display specific properties such as strong rheology effects and gel formation. A gel state of the pulp firstly ensures good fiber distribution as a result of prevention of sedimentation of the relatively heavy glass and/or mineral fibers.

Furthermore, the gel state of the synthetic sheet silicate as binder ensures a significant strength of and stiffness curing drying of the molded insulating part. The formation of the house-of-cards structure in the gel state presumably leads to good bonding to the inorganic fibers and to three-dimensional crosslinking in the molded insulating part, which in turn gives a high resistance to vibration. The flexural stiffness of the molded insulating part can be controlled by concentration stepping of the gelled sheet silicate without increased brittleness or tendency to fracture of the molded insulating part having to be accepted.

These properties are utilized for the present invention, as is the fact that sheet silicates are purely inorganic materials which result in an emission-free molded insulating part, both in production and in use.

In this way, the invention is for the first time able to provide a fiber casting process for producing a molded insulating part, which process avoids the disadvantages of the prior art.

The use of a casting tool having a cavity whose wall is at least partially water-permeable additionally makes it possible to withdraw the water present in the pulp introduced into the cavity in a simple manner from said pulp, so that only the molded insulating part remains. The withdrawal of the water compacts the glass fibers and/or mineral fibers and the sheet silicate and leads to an adhesion bonding these constituents, so that the molded insulating part is created thereby. The cavity can also have a simple structure, so that, for example, this has the negative shape of the molded insulating part to be produced on only one side. This can preferably be the side which has to be joined to a further component. To stay with the example mentioned at the outset of the exhaust gas catalyst of a motor vehicle, this would be the side of the molded insulating part which is to be inserted into the outer wall.

In a first embodiment of the invention, the withdrawal of water from the pulp is effected by means of a superatmospheric pressure or subatmospheric pressure produced within the casting tool, relative to normal atmospheric pressure. The water present in the pulp can in this way be removed in an accelerated manner via the water-permeable wall of the cavity, which can be achieved either by suction or by a pressure increase brought about within the cavity. Such a pressure increase can be produced, for example, by the upper tool and lower tool being pushed increasingly close together when the casting tool is closed. A subatmospheric pressure, on the other hand, can be achieved by means of, for example, vacuum suction. A pressure increase in particular additionally leads to increased compaction of the molded insulating part produced in the cavity, which can advantageously be utilized for the stability or the insulating effect of the molded insulating part. The process of the invention leads, in particular by production of the abovementioned pressure difference in the cavity, to short cycle times and can be carried out with little effort.

As an alternative to or in addition to a change in the pressure within the cavity of the casting tool, the withdrawal of water from the pulp can also be achieved by means of an increase in temperature produced in the casting tool to a value above room temperature. The increase in temperature accelerates the withdrawal of water from the pulp. A further advantage of the temperature increase is that the molded insulating part produced has a smaller proportion of residual moisture when it is taken from the casting tool. Thus, the molded insulating part produced in this way has a higher strength at this point in time.

Since the molded insulating part to be produced has to have defined properties both in respect of its thermal insulation and possibly also in respect of its acoustic insulation, it is advantageous, according to an embodiment of the solution according to the invention, for pulp to be introduced into the cavity of the casting tool a plurality of times in succession and the water to be withdrawn therefrom in each case. This makes it possible to produce a molded insulating part having wall cross sections reinforced at least in regions, so that the strength and the structure of the wall of the molded insulating part can be adapted appropriately to the requirements which the component has to meet.

In addition, a further proposal is that pulps having a different materials nature or composition be introduced in succession into the cavity of the casting tool. This measure makes it possible to obtain a molded insulating part which has locally different regions having properties matched to the installation situation. Thus, for example, fiber regions having different heat resistances can be present in alternate layers. The heat resistance has to match the temperature gradient occurring within an insulating layer. In this way, it is possible, for example, to combine a layer composed of fibers which are heat resistant up to 1000° C. with a subsequent layer which is heat resistant up to 600° C. This optimization leads to cost savings in production. This can also, for example, mean that the molded insulating part has sections having a low insulating effect and sections having a high insulating effect. This optimization leads to materials-saving production with optimized insulating effect. It is likewise possible to incorporate inserts of high-temperature-resistant fibers at thermally critical points, known as hotspots, into the cavity by, for example, covering the corresponding regions of the cavity before introduction of the pulp.

Furthermore, for example, glass fibers and/or mineral fibers having different fiber orientations, fiber structures or fiber lengths can alternate.

It is likewise possible to introduce pulp a plurality of times into the cavity of the casting tool only in locally delineated regions of the molded insulating part to be produced, which likewise has the abovementioned effects.

To achieve very substantial automation of the overall process for producing a molded insulating part, it is advantageous for the casting tool consisting of a lower tool and an upper tool which closes this to have a suction device connected to or integrated into the upper tool, by means of which the molded insulating part is, after it has been manufactured, drawn in and detached from the casting tool, so that it can be taken out of the open casting tool in this way. The suction device mentioned can, for example, produce a vacuum which is sufficient to draw in the molded insulating part and in this way release it from the lower tool so that it can subsequently be taken from the casting tool or transfer to a subsequent processing unit.

The detachment of the molded insulating part from the lower tool can be simplified or improved when, corresponding to an embodiment of the process of the invention, the lower tool has a pressure device or is connected to a pressure device. As pressure device, it is here possible to use, for example, a punch which detaches the molded insulating part mechanically from the lower tool or a pneumatic blowing device, i.e. a blowing device operated using compressed air. In conjunction with the above-mentioned suction device in the upper tool, an air flow according to the countercurrent principle can thus be generated when using a pneumatic pressure device in the lower tool, with firstly the molded insulating part in the upper tool being drawn in by a subatmospheric pressure and, secondly, a compressed air stream in the lower tool effecting and accelerating the detachment of the molded insulating part.

After detachment of the molded insulating part from the casting tool, it can be transferred in the above-described manner to a subsequent processing unit and processed further here. In one embodiment of the process of the invention, this processing unit can be a drying unit in which the residual moisture in the molded insulating part is withdrawn therefrom by a heat treatment at from 200° to 250° C. The proportion of residual moisture in the molded insulating part produced in the casting tool can be up to 70%.

The molded insulating part is subsequently, according to a further proposal of the invention, transferred to a firing apparatus, a dryer segment or a suitable, separately heatable apparatus in which water of crystallization still present in the molded insulating part can be additionally withdrawn therefrom by means of a subsequent firing procedure. Temperatures from 280° C. to about 400° C. are used here. An additional improvement in dimensional stability of the molded insulating part is achieved by this measure. Furthermore, the water absorption of the molded insulating part in humid air is suppressed thereby, leading to an increase in the storage stability of the molded insulating part.

After the molded insulating part has been taken out from the casting tool, the casting tool is cleaned so as to prepare it for the next production operation. Here, the cleaning of the cavity is of particular importance. It is possible here to use cleaning methods known par se, with it being particularly advantageous to carry out cleaning by means of a waterjet or by means of compressed air because of the effectiveness and brevity of the time required. Furthermore, it is also possible to utilize the aqueous fraction of the pulp withdrawn from the pulp for cleaning.

To save subsequent installation steps, a further proposal according to the invention is for the molded insulating part to be, in the casting tool, poured directly into an outer wall which accommodates this after its manufacture and is provided with numerous through-holes. Here, the through-holes present in the outer wall can be utilized for removing the water from the pulp. Such a procedure is particularly advantageous in the case of a molded insulating part which is used in a catalyst as mentioned at the outset for a motor vehicle.

A molded insulating part which has been produced by the above-described process and consists of a glass fiber/sheet silicate mixture is, according to the invention, characterized in that a pulp produced using water for producing the molded insulating part has a proportion of exclusively synthetic sheet silicate in the range from 0.5% to 2.5% and a proportion of glass fibers and/or mineral fibers of from 0.3% to 1.5%. The proportion of the sheet silicate is preferably less than 2%, in which case the proportion of the glass fibers and/or mineral fibers makes up about 1%.

In addition, the sheet silicate is preferably a powder, with aqueous solutions generally also being able to be used. The sheet silicate preferably consists of the constituents silicon dioxide ($SiO_2$) and aluminum oxide ($Al_2O_3$).

In a preferred composition of the sheet silicate, the sheet silicate has a proportion of silicon dioxide ($SiO_2$) in the range from 55% to 65%, a proportion of magnesium oxide (MgO) in the range from 25% to 30%, a proportion of lithium oxide ($Li_2O$) in the range from 0.7% to 0.9% and a proportion of sodium oxide ($Na_2O$) in the range from 2.5% to 3%.

In a further embodiment of the invention, the glass fibers and/or mineral fibers used for producing the pulp are amorphous fibers or crystalline fibers. The amorphous fibers here include, for example, glass staple fibers, chopped continuous glass fibers, AES high-temperature wool, biosoluble mineral wool or chopped silicate fibers, while examples of crystalline fibers are polycrystalline wool or single crystal fibers. A distinction is likewise made between short fibers and long fibers. Short fibers have a high surface quality and allow a very homogeneous distribution within the pulp. In addition, they result in very small tolerances in the molded insulating part to be produced. In comparison, long fibers have a comparatively higher strength and stiffness and also a lower tendency to fracture.

It is also within the scope of the invention to mix different fibers of the abovementioned types with one another.

A casting tool according to the invention for producing a molded insulating part allows the use of the above-described process and is characterized in that the casting tool consists of a lower tool and an upper tool which closes this and the cavity present in the casting tool corresponds at least on one side to the negative shape of the molded insulating part to be produced, where at least one inner surface of the casting tool has a plurality of individual holes.

The holes present in the casting tool make it possible to remove the water present in the pulp without removal of the glass fibers and/or mineral fibers present in the pulp or of the sheet silicate occurring. In other words, the holes have a diameter which is suitable for removing the aqueous fraction of the pulp but does not allow intrusion of other materials, meaning that the fibers present in the pulp remain in the cavity. According to the invention, the holes can have been introduced directly into the lower tool and/or into the upper tool.

Another possibility is to introduce the holes into the lower tool and/or the upper tool and subsequently, for example, lay a type of fine-meshed gauze into the cavity of the casting tool so that the pores of the gauze form the water-permeable surface of the cavity of the casting tool.

To improve the removal of the aqueous fraction present in the pulp, it is advantageous for at least part of the holes to be connected hydrodynamically to a suction device. The subatmospheric pressure produced by the suction device makes it possible to accelerate the production process for the molded insulating part.

In addition, a further proposal according to the invention is that part of the holes present be connected to a pneumatic pressure device and the remaining part of the holes be utilizable for removing the aqueous fraction of the pulp. Naturally, a combination of a suction device with a pressure device is also within the scope of the invention, so that in this case an increased internal pressure in the cavity is utilized for driving out the water present in the pulp, while at the same time sucking out of the water by the suction device occurs in a different place.

In this case, it is advantageous for the holes connected to the pneumatic pressure device to be present in the upper tool and the holes for the removal of water to be present in the lower tool.

BRIEF DESCRIPTION OF THE DRAWINGS

The holes are preferably microholes which can be introduced into the casting tool in different ways. Thus, it is possible to produce the microholes by means of an electron beam drilling apparatus, by means of a laser cutting device or by means of a laser-waterjet cutting device. According to the invention, the microholes preferably have a diameter in the range from 30 μm to 100 μm.

The invention is illustrated below with the aid of the accompanying drawings. The example shown does not constitute any restriction to the variant depicted, but instead serves merely to explain a principle of the invention. Identical or similar components are always denoted by the same reference symbols. In order to be able to illustrate the mode of operation according to the invention, the figures show only greatly simplified in-principle depictions in which the components not essential to the invention have been omitted. However, this does not mean that such components are not present in a solution according to the invention.

DETAILED DESCRIPTION OF THE INVENTION

Figure 1:
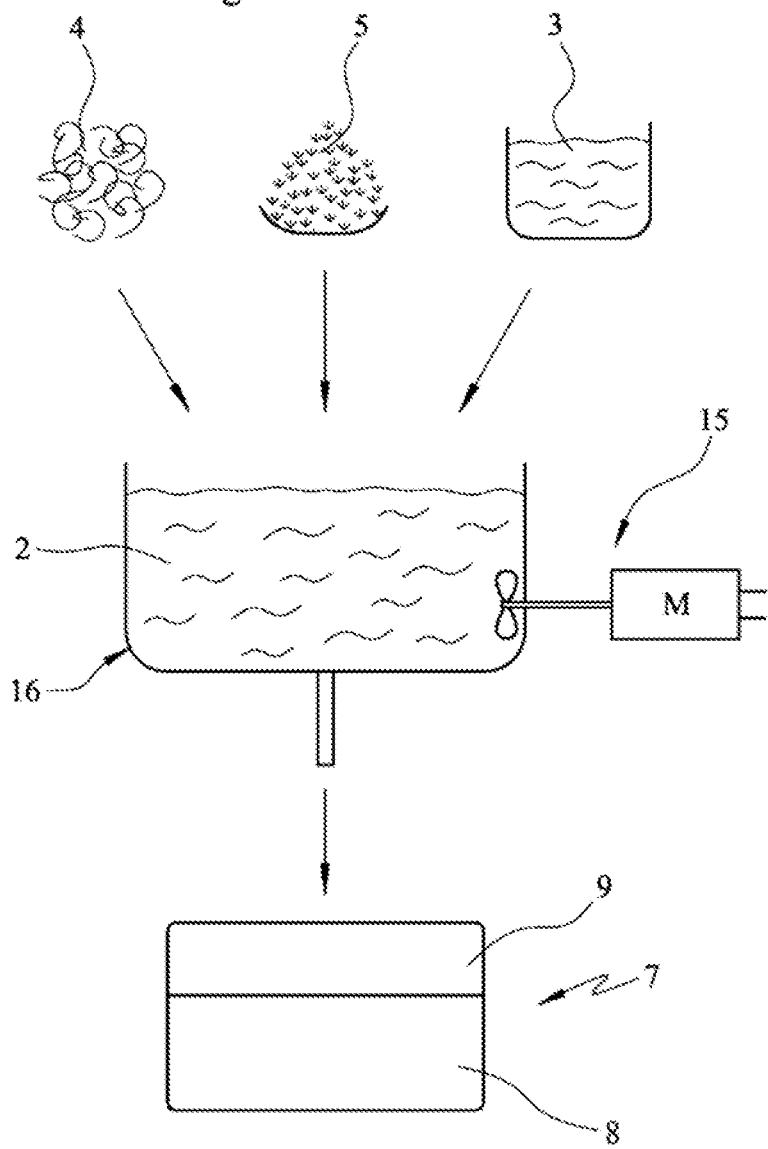
Figure 2:
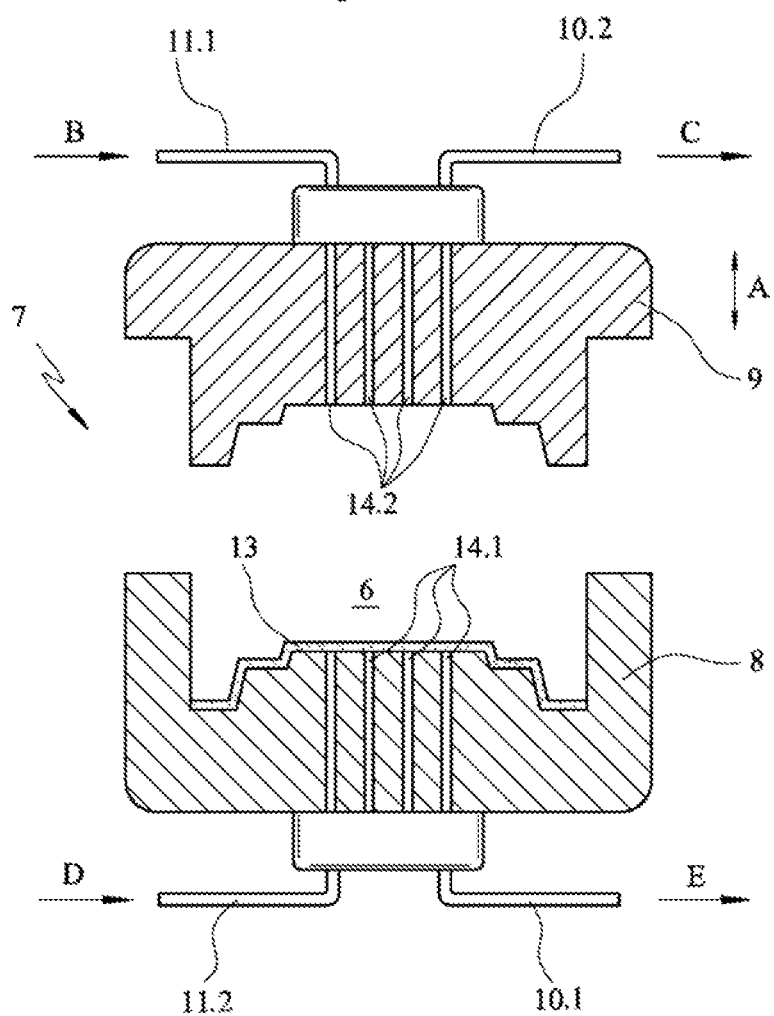
Figure 3:
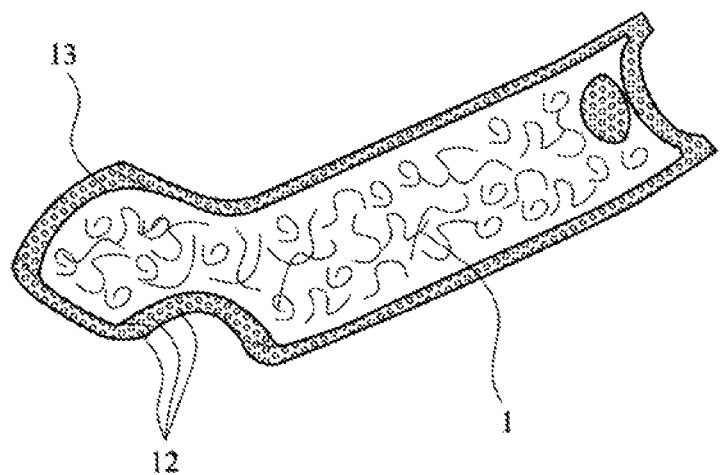

The figures show:

FIG. 1: a simplified in-principles flow diagram of the production of a pulp, FIG. 2: a schematic greatly simplified depiction of a casting tool and FIG. 3: a view into an outer wall of an exhaust gas catalyst of a motor vehicle with molded insulating part inserted therein.

The production of a pulp 2 depicted in simplified form in FIG. 1 is effected by mixing the basic constituents in a vessel 16. Here, water 3, glass fibers and/or mineral fibers 4 in the form of high-temperature wool and sheet silicate 5 are introduced into the vessel 16 and mixed by means of a stirring device 15 until a homogenous pulp 2 has been formed. Firstly, the synthetic sheet silicate 5 is introduced slowly to cold water in order to avoid formation of lumps. The mixture is subsequently stirred at high speed for a period of about 1 hour, which can be carried out, for example, by means of a rotor-stator system. The glass fibers and/or mineral fibers 4 are then mixed in using a slowly rotating stirring device 15 with a low shearing action in order to damage the glass fibers and/or mineral fibers 4 as little as possible.

The pulp 2 produced in this way can subsequently be poured into a casting tool 7 which is suitable for this purpose and is shown purely schematically in FIG. 1 and consists of a lower tool 8 and an upper tool 9 closing this.

FIG. 2 schematically shows, likewise in greatly simplified form, an illustrative depiction of such a casting tool 7. This casting tool 7 firstly consists of a lower tool 8 and an upper tool 9. The upper tool 9 can, in the example in FIG. 2, be moved in the direction of the double arrow A and is thus suitable for opening and closing the lower tool 8. In the closed state of the casting tool 7, it has a cavity 6 whose geometry corresponds to the negative shape of the molded insulating part 1 to be produced. The special feature of the embodiment of the casting tool 7 shown here is that at least part of the wall of the cavity 6 is water-permeable. For this purpose, an outer wall 13 of an exhaust gas catalyst for a motor vehicle which is to be insulated is placed in the cavity 6 of the lower tool 8 in the example depicted in FIG. 2. This outer wall 13 is provided with a plurality of through-holes 12 which bring about thermal and acoustic insulation of the exhaust gas catalyst equipped therewith and for the purposes of the invention are utilized for removing the water from the pulp 2. Below the outer wall 13 inserted into the lower tool 8, the lower tool 8 has a plurality of holes 14.1 through which the water 3 is removed from the pulp 2. To improve the effectiveness of the removal of the water 3, a suction device 10.1 is hydrodynamically connected to the holes 14.1 in the variant depicted. The suction device 10.1 produces a subatmospheric pressure and the water 3 is drawn off from the pulp 2 in the direction of the arrow E.

If the upper tool 9 of the casting tool 7 in FIG. 2 is now considered, it is conspicuous that holes 14.2 are also provided here and they serve, in the present case, to bring about an increase in pressure on the molded insulating part 1 to be produced, for which purpose the holes 14.2 in the upper tool 9 are hydrodynamically connected to a pressure device 11.1 so that, for example, compressed air can be fed in the direction of the arrow B to the upper tool 9.

When the molded insulating part 1 produced in this way is finished, the casting tool 7 can be opened. For this purpose, the suction device 10.1 and the pressure device 11.1 are closed off by means of suitable control valves. An increase in pressure can now be applied to the molded insulating part 1 by means of a pressure device 11.2 in the lower tool 8 in the direction of the arrow D by introduction of compressed air, which leads to detachment of the molded insulating part 1 from the lower tool 8. At the same time, the molded insulating part 1 is drawn in by means of a suction device 10.2 in the upper tool 9 of the casting tool 7, the suction device of which produces a vacuum in the direction of the arrow C. The molded insulating part 1 which is fixed thereby can be releasably fixed in this way and be transferred to a subsequent processing unit. The holes 14.1 in the lower tool 8 and the holes 14.2 in the upper tool 9 can thus be utilized for a further use after production of the molded insulating part 1, namely fixing and transfer of the molded insulating part 1.

FIG. 3 allows a look into an outer wall 13 of an exhaust gas catalyst with a molded insulating part 1 inserted therein. The outer wall 13 has a plurality of through-holes 12 and a complicated internal geometry which the molded insulating part 1 has to match in order to achieve an optimal insulating action.

LIST OF REFERENCE SYMBOLS

1 Molded insulating part
2 Pulp
3 Water
4 Glass fibers and/or mineral fibers
5 Sheet silicate
6 Cavity
7 Casting tool
8 Lower tool
9 Upper tool
10.1 Suction device
10.2 Suction device
11.1 Pneumatic pressure device
11.2 Pneumatic pressure device
12 Through-holes
13 Outer wall
14.1 Holes/microholes 14.2 Holes/microholes
15 Stirring device
16 Vessel
A, B, C, D, E Direction of movement

The invention claimed is:

1. A process for producing a molded insulating part (1) for thermal insulation, consisting of the following process steps:
producing an inorganic pulp (2) composed of water (3), glass fibers and/or mineral fibers (4) and sheet silicate (5); wherein the glass fibers and/or mineral fibers (4) are heat resistant up to a temperature ranging from 600° C. to above 1000° C.,
introducing the pulp (2) into a cavity (6) of a casting tool (7) whose wall is at least partially water-permeable, which cavity (6) has on at least one side the negative shape of the molded insulating part (1) to be produced,
removing the aqueous fraction present in the pulp (2), by using a sub atmospheric pressure, produced within the casting tool (7) relative to normal atmospheric pressure,
opening of the casting tool (7) and subsequent taking-out of the molded insulating part (1) produced.

2. The process as claimed in claim 1, wherein the withdrawing of water is accelerated by a temperature increase to a value above room temperature produced in the casting tool (7).

3. The process as claimed in claim 1, further comprising the step of introducing the pulp (2) into the cavity (6) of the casting tool (7) a plurality of times in succession and withdrawing the water (3) therefrom in each case.

4. The process as claimed in claim 3, wherein the pulp comprises a first material and a second material, the two materials differing in nature or composition; and the two materials are introduced in succession into the cavity (6) of the casting tool (7).

5. The process as claimed in claim 3, wherein pulp (2) is introduced a plurality of times into the cavity (6) of the casting tool (7) only in locally delineated regions of the molded insulating part (1) to be produced.

6. The process as claimed in claim 1, wherein the casting tool (7) comprises of a lower tool (8) and an upper tool (9) which closes this has a suction device (10.2) which is connected to or integrated into the upper tool (9) and by which the molded insulating part (1) is, after it has been manufactured, drawn in and detached from the lower tool (8) so that it can be taken from the opened casting tool (7).

7. The process as claimed in claim 1, wherein the lower tool (8) has, for detachment of the molded insulating part (1), a pressure device (11.2) or is connected to a pressure device (11.2) by means of which the molded insulating part (1) is, after it has been manufactured, released from the lower tool (8).

8. The process as claimed in claim 1, wherein the molded insulating part (1) taken from the casting tool (7) is transferred to a drying unit in which the residual moisture is withdrawn from the molded insulating part (1) by means of heat treatment at from 200° C. to 250° C.

9. The process as claimed in claim 1, wherein the molded insulating part (1) taken from the casting tool (7) is transferred to a firing apparatus in which water of crystallization is withdrawn from the molded insulating part (1) by means of a subsequent firing procedure.

10. The process as claimed claim 1, wherein the casting tool (7) is cleaned after the molded insulating part (1) has been taken out.

11. The process as claimed in claim 10, wherein the cleaning is carried out by a waterjet, pressurized air cleaning or by means of the aqueous fraction withdrawn from the pulp.

12. The process as claimed in claim 1, wherein the molded insulating part (1) is, in the casting tool (7), poured directly into an outer wall (13) which accommodates this after its manufacture and is provided with numerous through-holes (12), the through-holes (12) are utilized for removing the water (3) from the pulp (2).

13. A molded insulating part produced by a process claimed in claim 1, wherein the pulp (2) produced using water (3) for producing the molded insulating part (1) comprises of a glass fiber/sheet silicate mixture or mineral fiber/sheet silicate mixture has a proportion of synthetic sheet silicate (5) in the range from 0.5% to 2.5% weight of the pulp and a proportion of glass fibers and/or mineral fibers (4) of from 0.3 to 1.5% weight of the pulp.

14. The molded insulating part as claimed in claim 13, wherein the sheet silicate (5) is a powder having the constituents silicon dioxide ($SiO_2$) and aluminum oxide ($Al_2O_3$).

15. The molded insulating part as claimed in claim 13, wherein the sheet silicate (5) has a proportion of silicon dioxide ($SiO_2$) in the range from 55% to 65% weight of the pulp, a proportion of magnesium oxide (MgO) in the range from 25% to 30% weight of the pulp, a proportion of lithium oxide ($Li_2O$) in the range from 0.7% to 0.9% weight of the pulp and a proportion of sodium oxide ($Na_2O$) in the range from 2.5% to 3% weight of the pulp.

16. The molded insulating part as claimed in claim 13, wherein the glass fibers and/or mineral fibers (4) for producing the pulp (2) are amorphous fibers or crystalline fibers.

* * * * *